United States Patent [19]

Blake, Jr.

[11] 3,731,262

[45] May 1, 1973

[54] TIME MARK-NUMERAL GENERATOR SYSTEM

[75] Inventor: Roy B. Blake, Jr., Kernersville, N.C.

[73] Assignee: The United States of America as represented by the Secretary of the Navy

[22] Filed: Sept. 28, 1967

[21] Appl. No.: 672,679

[52] U.S. Cl. .................................. 340/2, 346/20
[51] Int. Cl. ................................................ G01s 1/72
[58] Field of Search .................... 346/20, 58, 59, 60; 340/2

[56] References Cited

UNITED STATES PATENTS 2,392,467   1/1946   Engel et al ............................ 346/60

*Primary Examiner*—Benjamin A. Borchelt
*Assistant Examiner*—N. Moskowitz
*Attorney*—G. J. Rubens, Arthur L. Branning and R. R. Anderson

[57] ABSTRACT

A system for recording at some remote point data which has been previously recorded by equipment located in a sonobuoy. Upon receipt of an interrogation signal the sonobuoy stops recording and starts to play back in the reverse direction. The recording time of the tape at the remote point is determined by using the time the playback is started and by using a digital clock circuitry to duplicate in time the sequence and rate of operation of the tape in the sonobuoy.

6 Claims, 6 Drawing Figures

Patented May 1, 1973

INVENTOR
ROY B. BLAKE, JR.

BY

ATTORNEY
AGENT

TIME MARK-NUMERAL GENERATOR SYSTEM

BACKGROUND OF THE INVENTION

The present invention relates to generator systems and more particularly to a time mark-numeral generator system which performs the major function of timing and identification. Time marks and numerals are permanently exposed on recording film so as to indicate the buoy number, time of day, the day, and the month that corresponding data on the film was recorded in the buoy at some remote point.

There frequently arise occasions when it is important to record over extended periods of time various sounds and noises which arise below the surface of the sea. This information would be particularly important during the case of a war to give an indication of submarine activity, or the information may be used to indicate the movement of schools of fish, the location of geodetic explosions, or even the movement of thermal tides. The usual procedure for obtaining this type of information is through the use of either passive sonar or listening equipment located within a moored sonor buoy. The buoys continuously record the sea noise on some form of film or magnetic tape usually in a frequency band in the neighborhood of 10 to 300 cycles per second. When it is necessary to retrieve the recorded information, an interrogation signal is sent to the buoy which then plays back the recorded data to some remote station. Certain procedures proposed for analyzing the data require a knowledge of the time of day signals were recorded in the buoy. For convenient application of these procedures, it is necessary to have a time scale corresponding to recording time written in the margin of the recording film. However, there are no timing signals available in the transmitted RF signal from the buoy to the remote station which can be used to determine recording time. Therefore, the construction of a time scale must be based on the time playback is started and the ratio of playback to recording speed, so experience from past attempts to write time numerals on the film manually indicated that an automatic system was needed.

SUMMARY

The time mark-numeral generator system of the present invention offers a substantial improvement over similar prior art devices in that it automatically and accurately identifies the remote buoys from which information is retrieved as well as indicating the time at which the recording was accomplished. When interrogated the buoy plays back recorded information at 50 times the recording speed, thereby providing a time scale multiplication and a shift in the frequency band from 500 to 15,000 cycles per second. In operation the system automatically generates and records one-half hour time marks, one hour time marks, and one hour numerals on the film so that these marks and numerals correspond to the time the data was recorded in the buoy. In addition, the month and day of interrogation and the post or buoy number are written on the film. Arabic numerals are generated electronically by intensity modulating the cathode ray tube in each recording unit. The buoy number, the month and the day to be written are selected as two digit numbers manually by means of decimal to binary switches on the control panel. Time marks and numerals are generated automatically through the operation of a master clock.

In normal operation the buoy continuously records sea noises at a very low tape speed. Enough tape is provided such that the buoy can store data for periods in excess of 24 hours, the tape machine being designed such that electrically the tape is in a continuous loop. When an interrogate signal is received from some remote station, the buoy tape recorder stops recording and starts playback in the reverse direction with a speed multiplication ratio of 50. To prevent loss of data during the reversal process, the tape is stopped for a fixed time interval to permit moving parts in the recorder to attain operating speed in the reverse direction. After playback of all the stored data, the buoy automatically reverts to the record mode. If the buoy is not interrogated before information has been recorded on all the tape, the oldest data is erased and new data recorded. The recording time is determined in the generator system located at some remote point by using digital clock circuitry to duplicate in time the sequence and rate of operation of the tape in the buoy. Thus, the accuracy of the time scale written on the margin of the film depends upon the accuracy in duplicating electronically the time delay during tape reversal, the frequency, stability and granularity of the clock circuitry and the speed regulation of the tape transport in the buoy. The frequency stability of the clock circuitry is within plus or minus 0.03 percent and the effective granularity is one minute. The tape reversal delay is specified at 25 plus or minus 2 seconds, and the speed regulation of the transport is specified at plus or minus 2 per cent. With the above tolerances the maximum error in the time scale should not exceed approximately 30 minutes for a recording time of 24 hours.

An object of the present invention is the provision of a time mark-numeral generator system.

Another object is the provision of a time mark-numeral generator system which automatically records timing and identification information on film.

Still another object is the provision of a time mark-numeral generator system which makes it possible to determine the time information has been previously recorded at some remote station.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

DESCRIPTION OF DRAWINGS

Referring now to FIG. 1, there is shown a diagrammatic presentation of the environment in which the invention may be used. Sonobuoy 10 has located within it magnetic tape recording equipment 11, the buoy being anchored in a body of water 12 within which there may be various noises which it is desirous to record. Atop of buoy 10 is an antenna 13 which may be used to receive interrogating pulses and to transmit recorded data back to a time mark-numeral generator system 15 which, in the present instance, may be located in an airplane 14. Thus it can be seen that the sonobuoy 10 acts as a passive sonar or listening post to record noise present in the body of water 12 and continues its function until interrogated by some distant station, as the airplane, at which time the recording ceases and playback commences, broadcasting the recorded information to the time mark-numeral generator 15.

In FIG. 2 there can be seen that the major units making up the system consist of an external DC power supply 18, a remote switching control panel 16, and a time mark-numeral generator cabinet 15. Within the cabinet 15 there is located a master clock the details of which will be shown in FIG. 3, and 8 mark-numeral generator channels, details of which are shown in FIG. 4. The eight generator channels are identical and each operates independently with a master clock and a single processor channel, so for the sake of simplicity only a single channel will be described hereinafter.

Turning now to FIG. 3, there is seen a schematic diagram of the master clock which controls the timing sequence of the device. The timing reference for the clock is an 800 cycle per second tuning fork oscillator 20, this frequency being first divided by monostable divider circuit 21 to 8/3 cycles per second, and then by binary counters 22 to one-sixtieth cycles per second to produce ultimately pulses at 1-minute intervals. The one-minute pulses drive a four-stage binary coded decimal counter 23 which determines the minute setting of the clock. A binary to decimal decoder, such as 27, and a read-out device such as 28 are used to monitor the state of the counter. The output of each stage of the counter is brought out of the clock and connected to each mark-numeral generator channel. A 10 minute counter 24, a 1 hour counter 25, and a 10 hour counter 26 determines the setting of the remainder of the digits in the clock. The operation of these last three counters is similar to that of the minute counter 23 with exception that the 10 minute counter and the 10 hour counter 26 require only three and two stages, respectively. The master clock is initially set to standard time by means of a pulse generator 31, a push button 32, and a selector switch 30. When the push button 32 is depressed the pulse generator 31 advances the state of the selected counter as determined by switch 30 by one unit.

Figure 1:
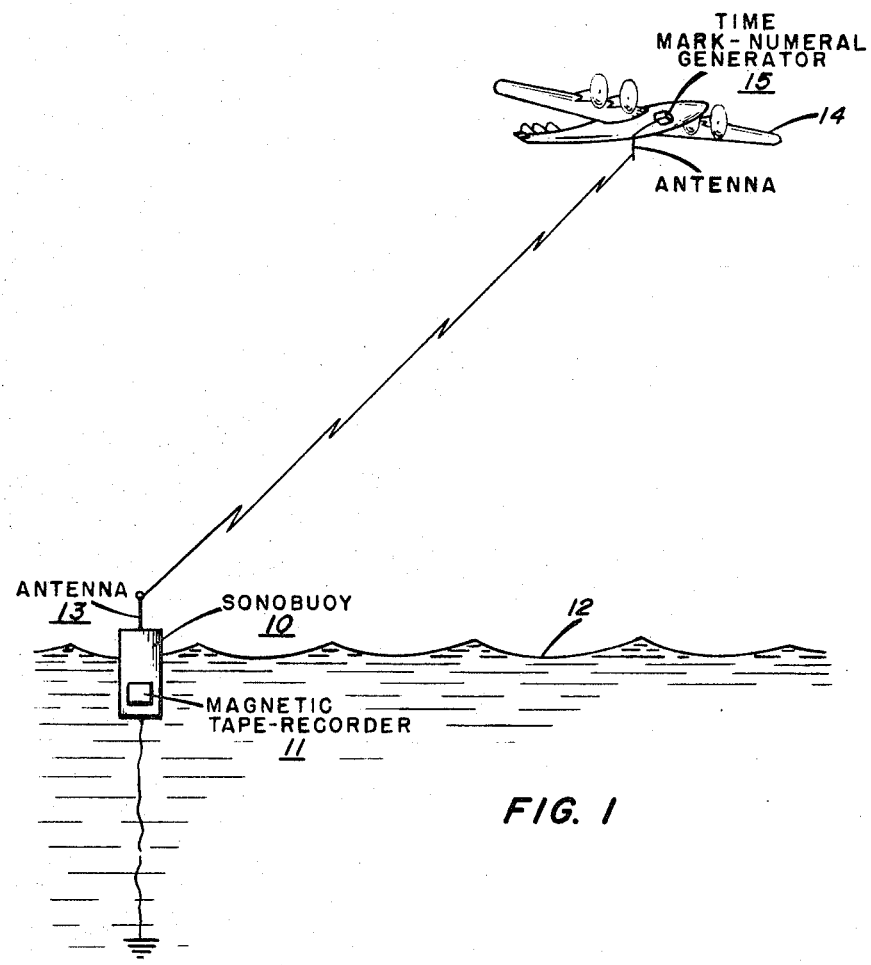
FIG. 1 is a diagrammatic illustration of a sonobuoy system utilizing the present invention.
Figure 2:
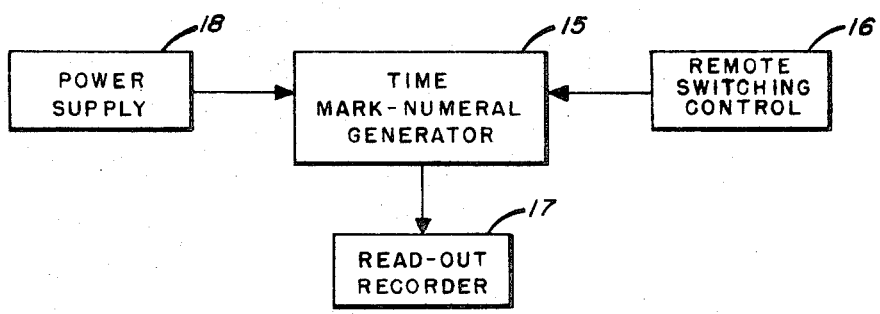
FIG. 2 shows a block diagram of the components of the invention.
Figure 3:
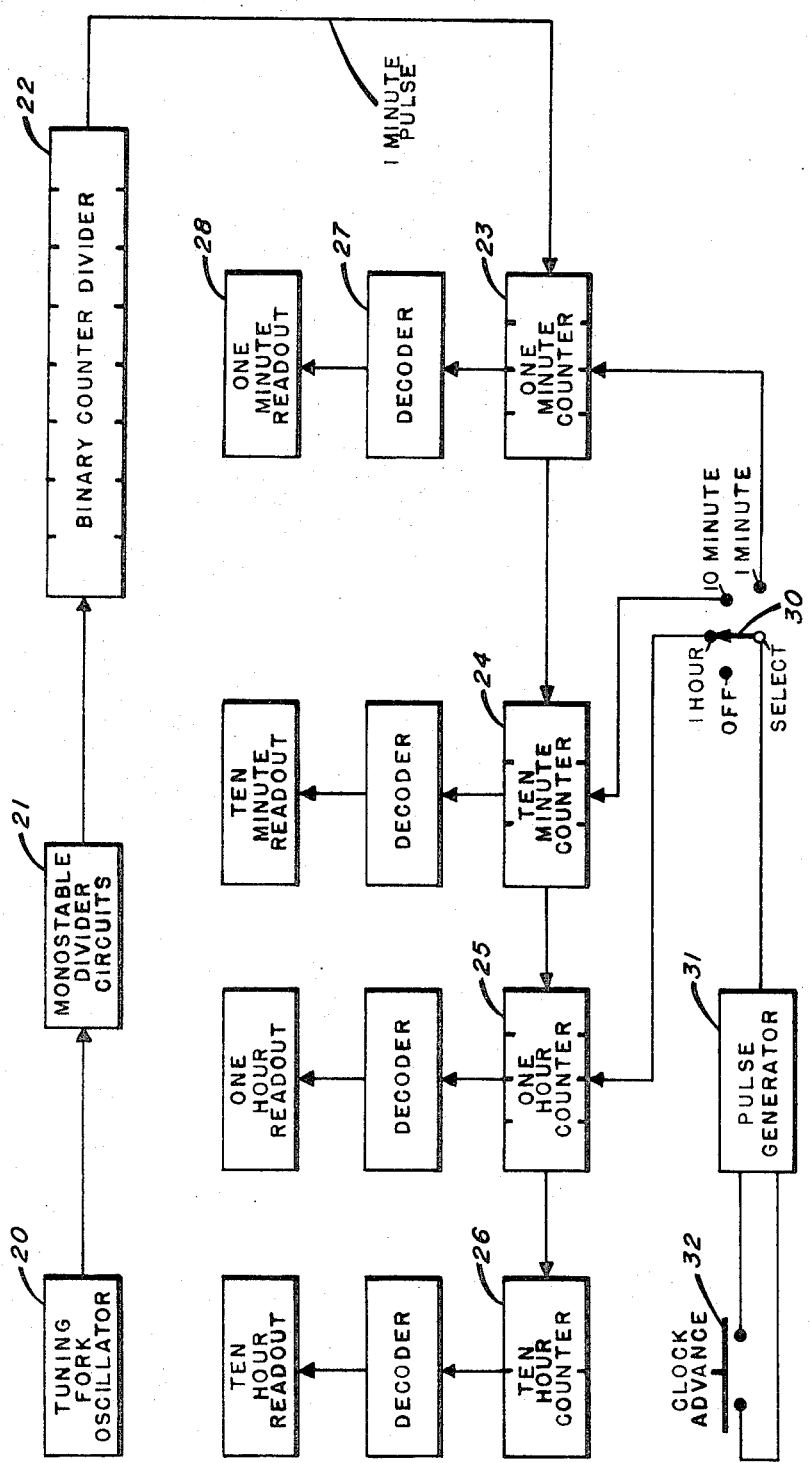
FIG. 3 shows the detail of the master timing clock.
Figure 4:
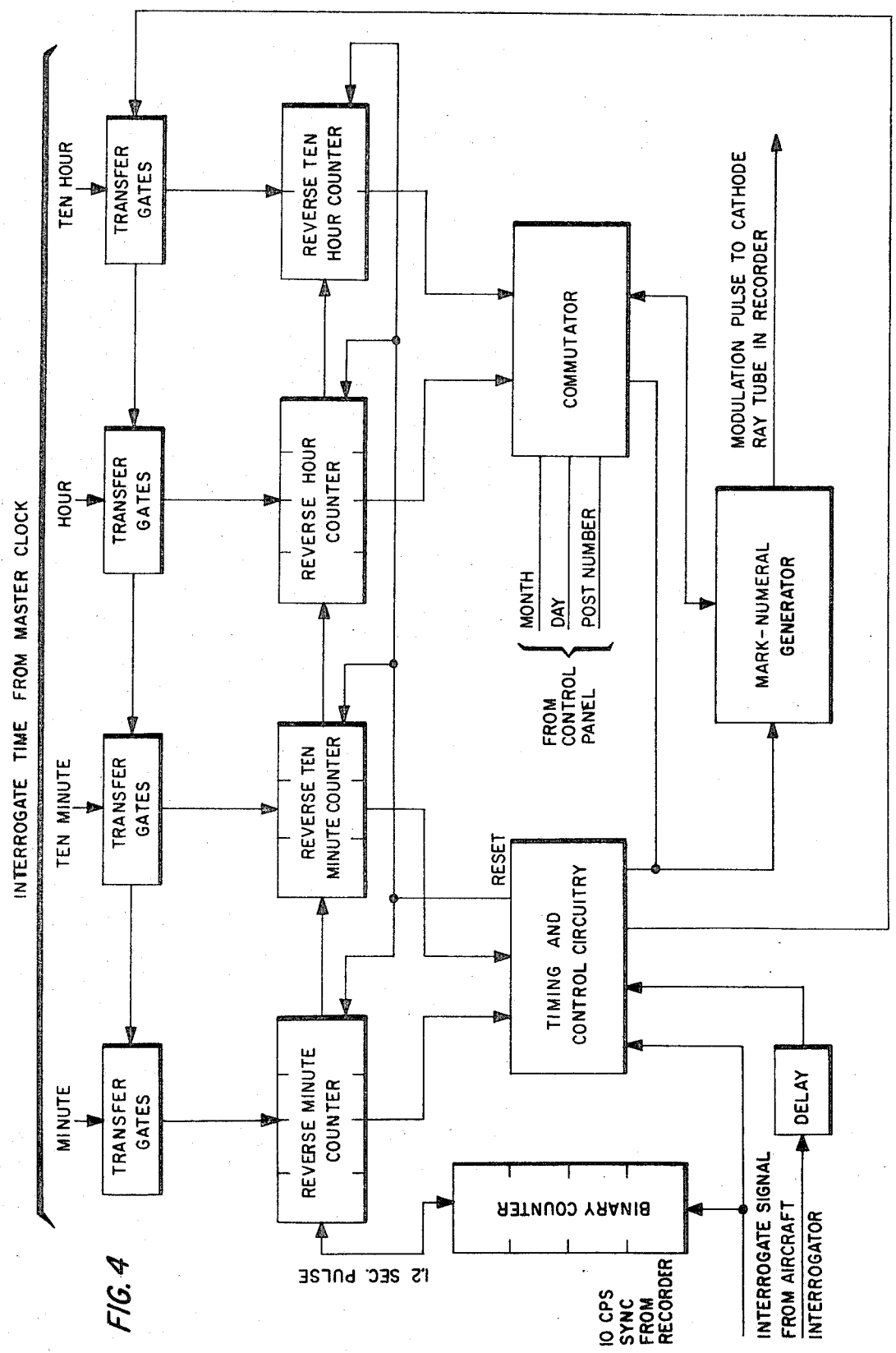
FIG. 4 shows a block diagram of the mark-numeral generator channel.

The time mark-numeral generator channel, a block diagram of which is shown in FIG. 4, automatically records one-half hour and hour numerals on the film in the associated readout recorder 17. These marks and numerals correspond to recording time in the buoy 10. The post or buoy number, the month, and the day are set into the system at the start of the playback period. Arabic numerals are generated electronically by intensity modulating the cathode ray tube forming a component of readout recorder 17. The unit shown in FIG. 4 contains a group of binary coded decimal counters similar to those in the master clock but arranged to count in reverse. These counters thereby form a reverse clock at 50 times real time. The timing reference for the clock is 10 cycles per second pulses synchronized to the horizontal sweep voltage in the recorder 17, the pulse frequency then being divided by 12 to produce a 1.2 second or one-fiftieth of a minute rate.

Figure 5:
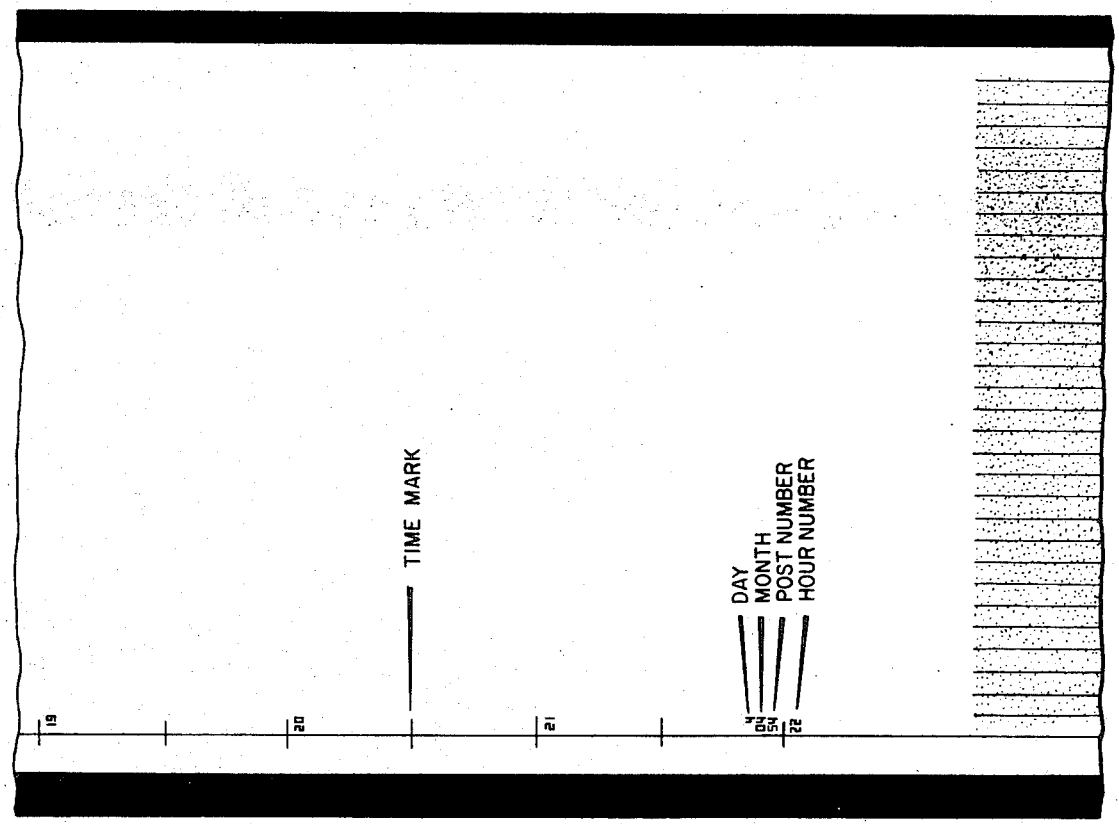
FIG. 5 illustrates the format of time marks and numerals on the film.

An illustration of the format of the time marks and numerals on the film is shown in FIG. 5. Prior to buoy interrogation, the signal input to the generator channel is connected to a noise and calibration frequency generator so that calibration lines imposed on a noise background appear on the film. The portion of the film between zero and tenth cycle per second calibration lines is used to write numbers since this frequency band is not used in the pass band of the system. At each point in time when the reverse clock counts through an even hour or an even half-hour, a signal in the mark-numeral general circuitry records a time mark on the film. Beginning four minutes in reverse time prior to an even hour the two digit hour numbers stored in the reverse hour counters is written on the film. In addition to hour numbers, the buoy number, the month, and the day are written on the film once during playback as a group of three two-digit numbers immediately following the time mark for the first hour number. The first hour number is written when the reverse clock counts through the first even hour after interrogation, unless the time of interrogation is between an even hour and 4 minutes past the hour. In this case insufficient time is available to write the first hour number and only the time mark is written. The start of the number sequence is delayed until the next even hour. At the end of buoy payback, calibration lines are restored to the film and the sequence of the marks at the hour numbers is stopped by manually depressing a push button.

Figure 6:
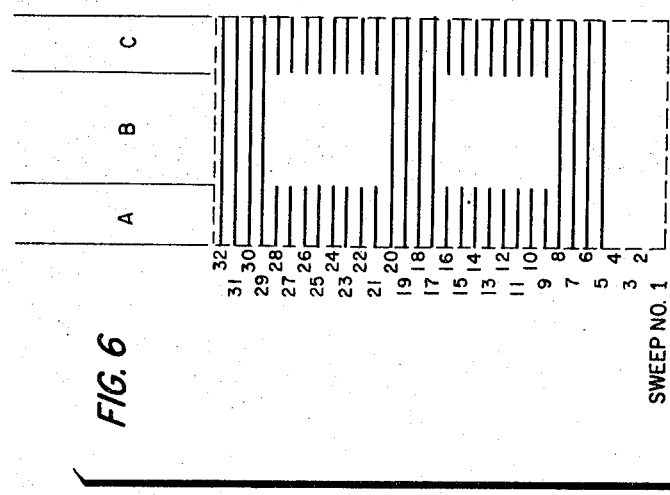
FIG. 6 illustrates the method of writing numerals on the film.

FIg. 6 is a sketch illustrating the method of writing numerals on the film. Numerals are generated by intensifying the beam of the cathode ray tube in the recorder for different combinations of the time intervals, A, B and C during successive horizontal sweeps. The sequence for forming the numeral 8 is shown in the figure. The remaining numerals are formed by deleting selected pulses from the sequence, 32 sweeps being required in the format. The first four sweeps are used for a space. On the film read-out adjacent sweeps overlap so that the resulting numerals appear in block form as shown in the figure.

Turning now to the actual operation of the system, it can be seen that the following steps must be accomplished. As the airplane 14 approaches a buoy which it wishes to interrogate, such as buoy 10, for example, the time mark-numeral generator equipment aboard the plane must be set up prior to the interrogation. Thus, the internal noise and calibration frequency generator is connected to the signal input of the channel to provide the calibration lines on the film of the recorder 17 as shown in FIG. 5. Once the recorder 17 has been calibrated and made ready for operation, the next step is then to advance the master clock to standard time. The clock setting should always be checked prior to interrogation of each group of buoys since it is always possible that the readout may not be a valid clock setting. In order to advance the master clock, first place the select switch 30 to the one minute position. Then successively depress and release the button 32 until the least significant minute digit is the next number below the correct digit. Wait until the even minute and depress the push button one more. Now place the select switch in the ten minute position and depress and release the push button until the most significant ten minute digit is correct. Now place the select switch in the one hour position, also depressing and releasing the push button until the hour digits are correct. Finally, place the select switch in the off position.

The next step in the preparation is now to set the month and day and this is accomplished by rotating the month and day switches on the control panel to the month and day of the buoy interrogation. Follow this by setting the post number of the first buoy to be interrogated in the proper post number switches and the system is ready for playback. A contact closure in the aircraft interrogator equipment signals the generator channel in coincidence with the start of transmission of the RF interrogation signal to the buoy. This signal also stops the calibration lines on the film and starts the sequence of marks and numerals. At the moment the interrogate signal is transmitted to the buoy, a contact closure in the aircraft interrogator signals the generator channel by operating a relay in the top of the cabinet. Contacts on the relay immediately connect the signal input of the generator channel to the output of the receiver which is receiving the playback signal from the buoy. After a fixed delay of 25 seconds to compensate for the delay in the start of buoy playback, all logic circuitry in the generator channel is reset and the master clock setting is transferred into the reverse clock counters. Thus, as the reverse clock counters run backward during the playback the state of the clock coincides with the time the data being analyzed in the generator channel was recorded in the buoy. As stated previously, at each point in time when the reverse clock counts through an even hour or an even half hour, a signal in the mark-numeral generator circuitry records a time mark on the film. In addition to hour members, the post or buoy number, the month and the day are written on the film once during playback. The time marks continue until the end of buoy playback, at which time calibration lines are restored to the film and the sequence of time marks and hour numbers are stopped by manually depressing a push button. Also at the end of playback equipment within the buoy itself again reverses its direction of magnetic tape thereby restoring the recording mode so that the buoy once more acts as a listening post for underwater noises.

As has been stated previously, the present system may consist of up to 8 independent generator channels each of which has the circuitry shown in FIG. 4 and all of which operate off of the master clock thereby providing for the interrogation of the individual sonobuoys each having a different frequency of playback. For the sake of simplicity the operation of only one channel has been described herein. It should also be noted while the system has been shown as operating aboard an aircraft, this embodiment is by no means limiting on the scope of the invention since the system will work equally well should it be stationed at some permanent land installation.

From the above description of the structure and operation of the present invention, it is obvious that there has been described a system offering vast improvement over prior art systems of similar kinds. The invention provides a time mark-numeral generator system which accurately and automatically provides a time scale so that independently made recordings may be reproduced at a latter time and an accurate indication obtained as to the time of day the signals were originally recorded.

Obviously many modifications and variations of the present invention are possible in the light of the above teachings. It is therefore to be understood that within the scope of the appended claims the invention may be practiced otherwise than as specifically described.

What is claimed is:

1. A system for recording time and identification information comprising:
    a master clock having a tuning oscillator, monostable divider circuits connected to the output of the tuning oscillator and a binary counter divider connected to the monostable divider for producing pulses at one minute intervals;
    means connected to the master clock for advancing the master clock to set it to standard time;
    a mark-numeral generator associated with the master clock;
    a mark-numeral generator channel associated with the mark-numeral generator;
    means for inserting identification data, such as the date, the month and day into the generator channel; and
    means for displaying the time and identification information received from the generator channel.

2. The system of claim 1 wherein the master clock further includes a minute binary counter connected to the output of the binary counter to count the 1 minute pulses;
    a 10 minute binary counter connected to the output of the one minute counter;
    a 1 hour binary counter connected to the output of the ten minute counter; and
    a 10 hour binary counter connected to the output of the 1 hour counter.

3. The system of claim 2 wherein the master clock further includes a decoder and a readout circuit connected to the minute, 10 minute, 1 hour and 10 hour counters.

4. The system of claim 3 wherein the means to advance the master clock consists of an ON-OFF switch, a pulse generator connected to the ON-OFF switch, and a selector switch connected to the pulse generator and to the one minute, ten minute, 1 hour and 10 hour counters for determining which of the plurality of binary counters is to be advanced.

5. The system of claim 4 wherein the generator channel is connected to the master clock and comprises:
    timing and control circuitry;
    delay means connected to the timing and control circuitry for delaying a portion of the input to the timing and control circuitry;
    1 minute, 10 minute, 1 hour and ten hour reverse binary counters connected to the timing and control circuitry;
    means connected to the reverse binary counters to interrogate time from the master clock;
    commutator means connecting the output of the timing and control circuitry to the mark-numeral generator; and means connecting the output of the mark-numeral generator to the display means.

6. The system of claim 5 wherein the means to insert the month, day and identification data into the numeral generator channel comprises manually operable decimal to binary switches connected to the commutator means.

* * * * *